United States Patent [19]

Weinstein et al.

[11] Patent Number: 5,635,944
[45] Date of Patent: Jun. 3, 1997

[54] MULTI-BAND ANTENNA FEED WITH SWITCHABLY SHARED I/O PORT

[75] Inventors: Harry M. Weinstein, Franklin, Mass.; Joseph M. Baird; Bryant F. Anderson, both of Sandy, Utah

[73] Assignee: Unisys Corporation, Blue Bell, Pa.

[21] Appl. No.: 357,904

[22] Filed: Dec. 15, 1994

[51] Int. Cl.$^6$ ............... H01Q 13/00; H01P 1/213
[52] U.S. Cl. ............... 343/776; 343/786; 343/785; 333/135; 333/106; 333/108
[58] Field of Search ............... 333/106, 108, 333/126, 129, 135; 343/773, 776, 785, 786

[56] References Cited

U.S. PATENT DOCUMENTS

| | | | |
|---|---|---|---|
| 2,629,048 | 2/1953 | Dyke et al. | 333/108 X |
| 3,500,419 | 3/1970 | Leitner et al. | 333/126 X |
| 4,319,206 | 3/1982 | Schuegraf | 333/126 |
| 4,785,306 | 11/1988 | Adams | 393/785 X |
| 5,003,321 | 3/1991 | Smith et al. | 333/126 X |
| 5,109,232 | 4/1992 | Monte | 333/135 X |

*Primary Examiner*—Benny T. Lee
*Attorney, Agent, or Firm*—Charles J. Fassbender; Mark T. Starr; Steven R. Petersen

[57] ABSTRACT

A single integrated antenna feed transmits and receives electromagnetic waves in the C, X, and Ku frequency bands. This antenna feed includes an inner metal tube which lies along a central axis, and an outer metal tube which surrounds and is coaxial with the inner metal tube. Through the inner tube, a passageway is provided which is sized to carry electromagnetic waves in the X-band and Ku-band, but reject electromagnetic waves in the C-band. Between the inner tube and the outer tube, another passageway is provided which is sized to carry electromagnetic waves in the C-band. An I/O port for the X and Ku-bands is provided by a first end of the inner tube, and an I/O port for the C-band is provided by a corresponding first end of the outer tube. This first end of the outer tube lies proximate to but not past the first end of the inner tube. A solid dielectric is inserted into and fills the first end of the inner tube; and, a hollow metal cone is attached to the first end of the outer tube.

12 Claims, 8 Drawing Sheets

| PORT | BAND | XMT/RCV | FREQ IN GHz | POLARIZATION AT PORT $P_0$ |
|---|---|---|---|---|
| $P_1$ | C | RCV | 3.625 – 4.200 | HORIZONTAL |
| $P_2$ | C | XMT | 5.850 – 6.425 | HORIZONTAL |
| $P_3$ | C | RCV | 3.625 – 4.200 | VERTICAL |
| $P_4$ | C | XMT | 5.850 – 6.425 | VERTICAL |
| $P_5$ | X | RCV | 7.250 – 7.750 | RH CIRCULAR |
| $P_6$ | X | XMT | 7.900 – 8.400 | LH CIRCULAR |
| $P_7$ | Ku | RCV | 10.950 – 12.750 | HORIZONTAL |
| $P_8$ | Ku | XMT | 14.000 – 14.500 | VERTICAL |
| $P_0$ | ALL OF THE ABOVE | | | |

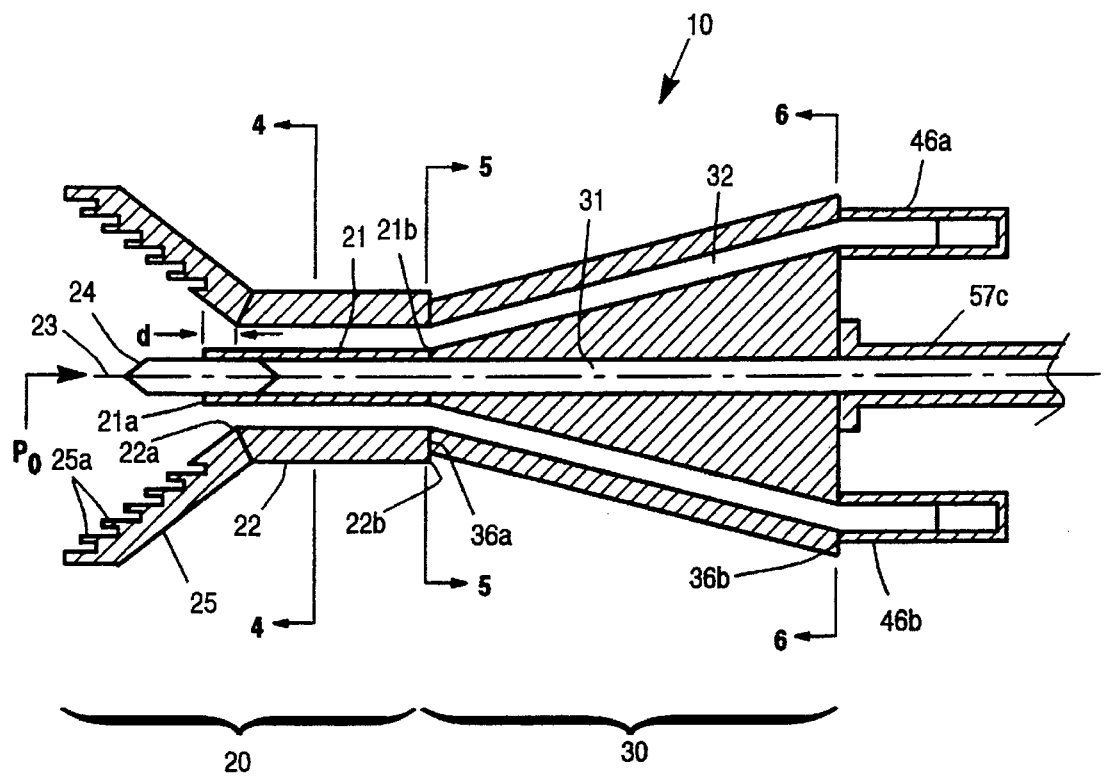
*Figure 3*
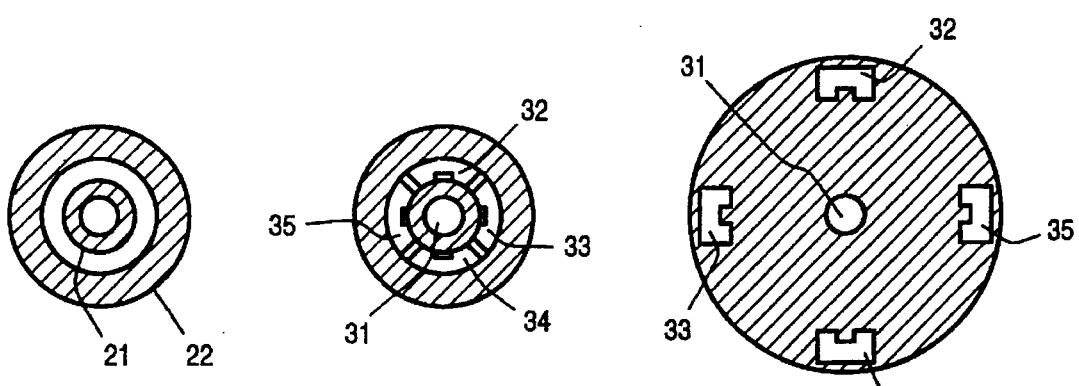
*Figure 4*  *Figure 5*  *Figure 6*

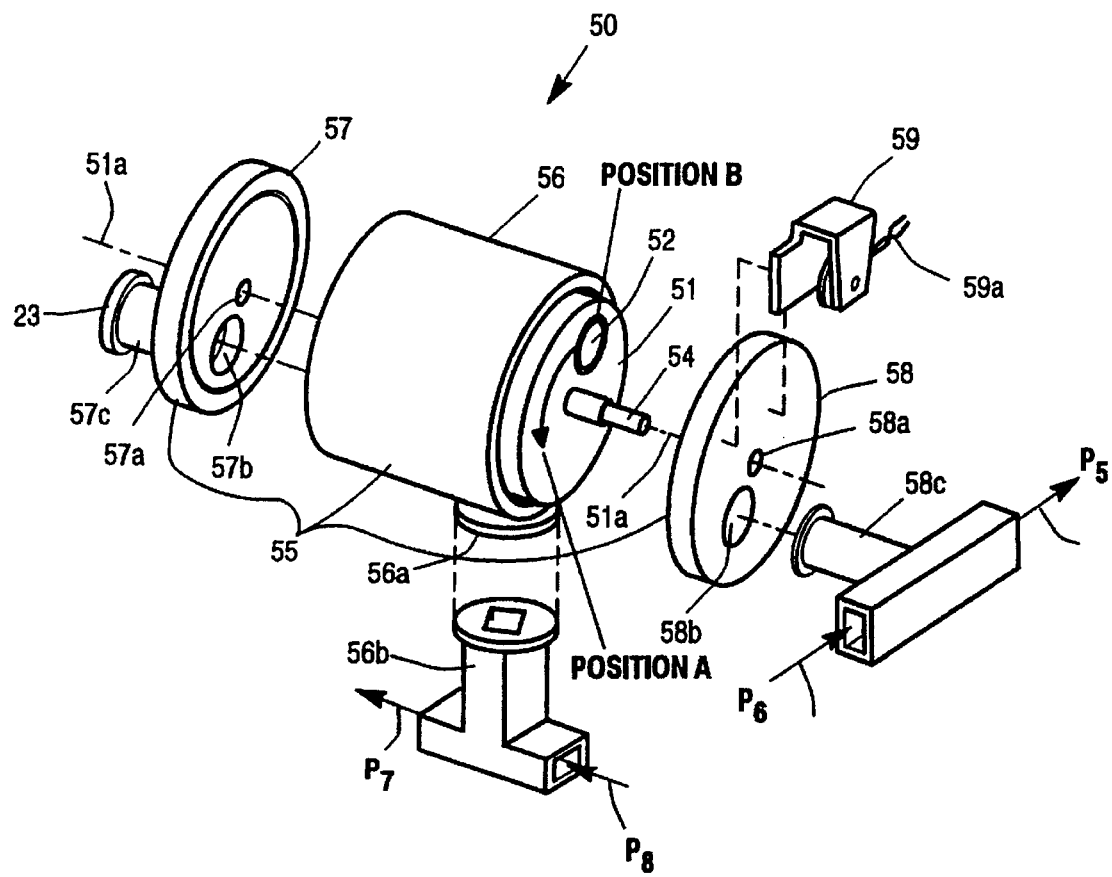
Figure 8
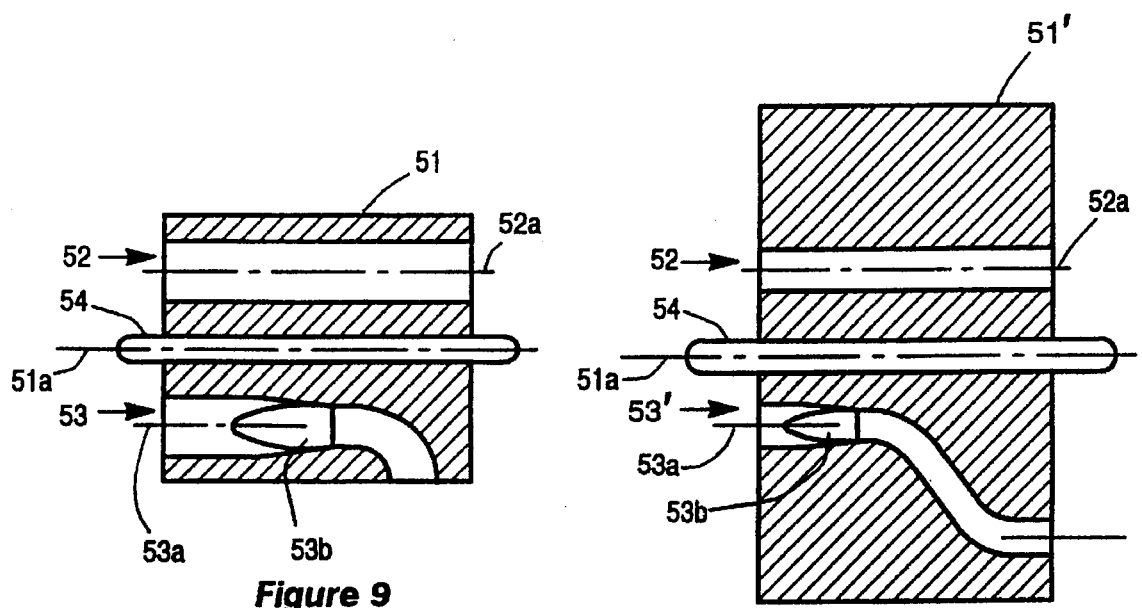
Figure 9
Figure 9A

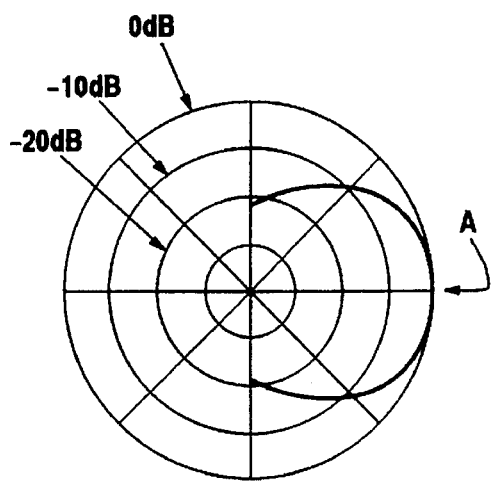
Figure 12a 3.625 GHz
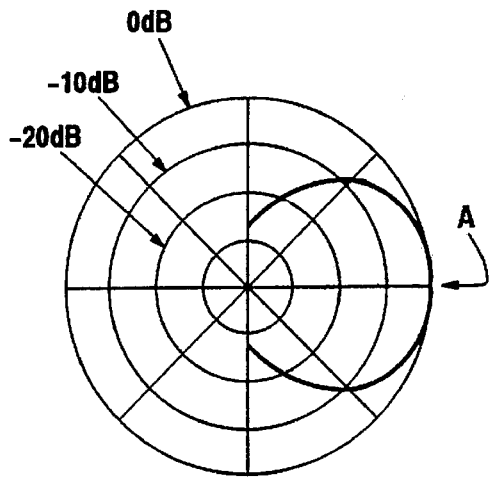
Figure 12b 6.400 GHz
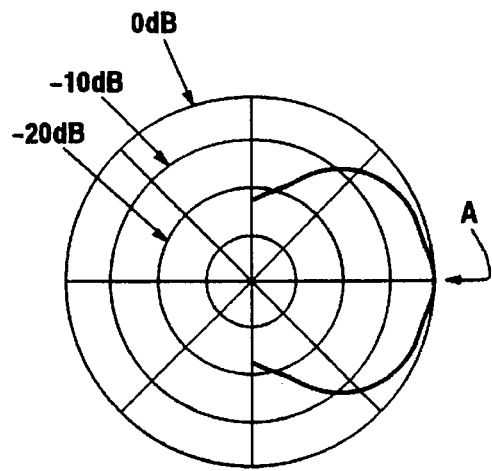
Figure 12c 7.250 GHZ
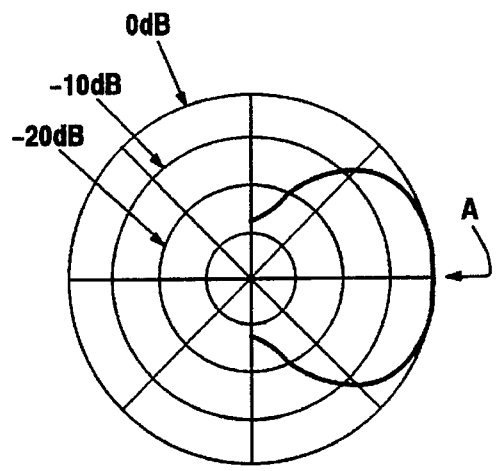
Figure 12d 8.400 GHz
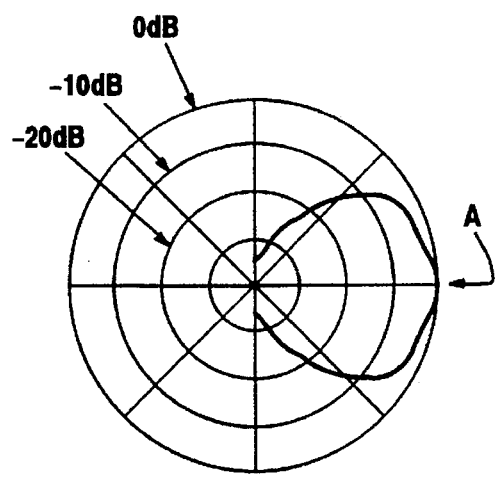
Figure 12e 10.95 GHz
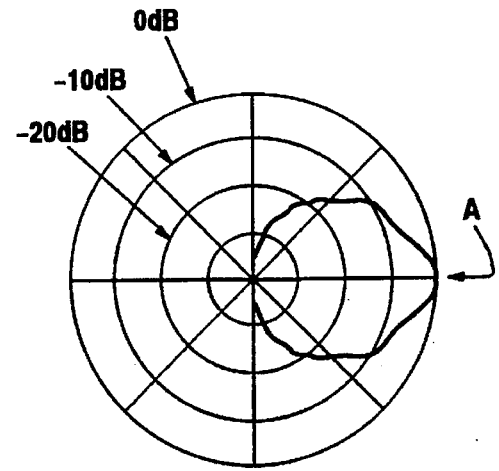
Figure 12f 14.50 GHz

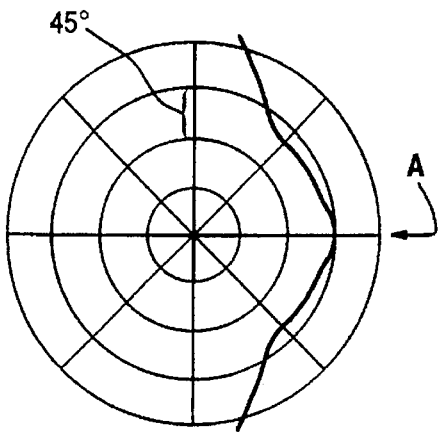
*Figure 13a 3.625 GHz*
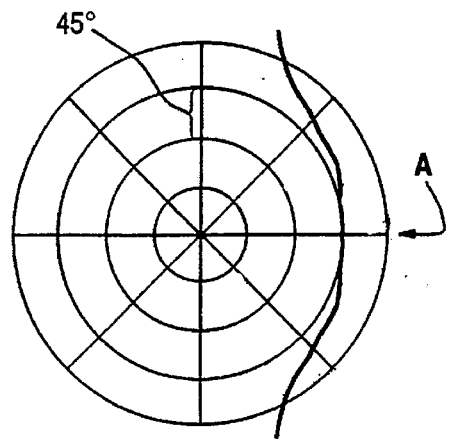
*Figure 13b 6.400 GHz*
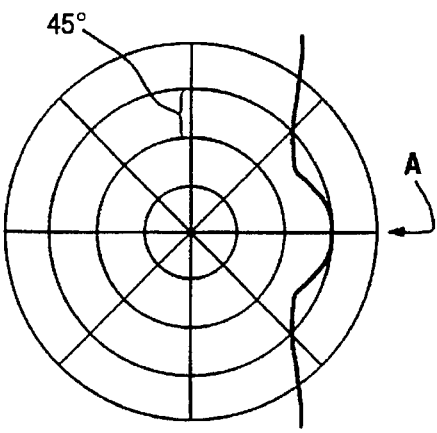
*Figure 13c 7.250 GHz*
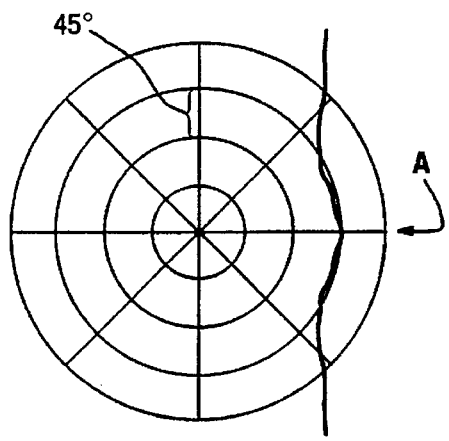
*Figure 13d 8.400 GHz*
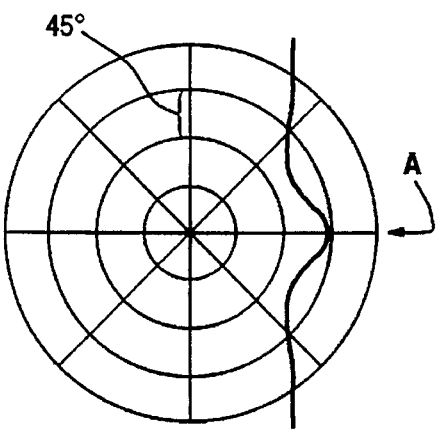
*Figure 13e 10.95 GHz*
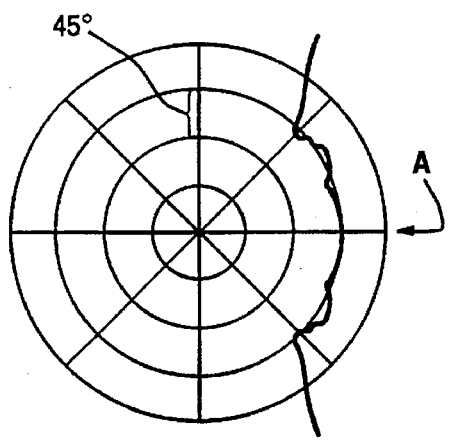
*Figure 13f 14.50 GHz*

MULTI-BAND ANTENNA FEED WITH SWITCHABLY SHARED I/O PORT

CROSS-REFERENCE TO RELATED APPLICATIONS

This invention relates to a co-pending application Ser. No. 08/357,903 which has the same filing data, same inventors, and same assignee as the present application.

BACKGROUND OF THE INVENTION

This invention relates to the art of wireless communication; and more particularly, it relates to antenna feed structures which transmit and receive electromagnetic waves in the C, X, and Ku frequency bands from a single I/O port.

By the C-band is herein meant the set of frequencies which range from 3.625 GHz to 6.425 GHz. Likewise, by the X-band is herein meant the set of frequencies which range from 7.250 GHz to 8.40 GHz; and by the Ku-band is herein meant the set of frequencies which range from 10.950 GHz to 14.500 GHz.

In the prior art, the C, X and Ku frequency bands have been used to communicate from a ground station on Earth to a geosynchronous satellite and back to another ground station on Earth. Each of the bands C, X, Ku are normally subdivided into many sub-bands of about 36 MHz to 210 MHz; and in each such sub-band, one or more data streams are transmitted and/or received.

To transmit one data stream, a data signal which may be digital or analog, is first sent to a modulator circuit in a ground station. There, the data signal modulates a carrier signal whose frequency lies within a certain sub-band. Then the modulated carrier signal is sent to an input port on a waveguide assembly, which is commonly called an antenna feed. This antenna feed acts as a transducer that converts the modulated carrier to radiated electromagnetic waves at an input/output port (I/O port). From the I/O port, the waves are directed by one or more reflectors at the ground station to the geosynchronous satellite.

To receive one data stream, the above process occurs in reverse. That is, radiated electromagnetic waves from the satellite are first directed by the reflectors at the ground station into the I/O port of the antenna feed. Then, the antenna feed acts as a transducer to route the received waves to appropriate receive ports. From there, the modulated carrier is then demodulated to recover the data stream.

However, a major limitation with the prior art is that in order to transmit/receive in all three of the frequency bands C, X and Ku, three physically separate antenna feed structures are needed. That is, a C-band antenna feed with its own I/O port is needed for transmitting/receiving in the C-band; an X-band antenna feed with its own I/O port is needed for transmitting/receiving in the X-band; and a Ku-band antenna feed with its own I/O port is needed for transmitting/receiving in the Ku-band.

Since three separate antenna feed structures are needed, it follows that the data transmission/reception from one parabolic reflector can occur only in one frequency band at a time. For example, before data transmission/reception can occur in the C-band, the C-band antenna feed must be physically moved such that its I/O port is located at the focal point of the parabolic reflector. Then, to switch data transmission/reception to the X-band, the C-band antenna feed must be physically moved out of the focal point of the reflector and X-band antenna feed must be physically moved to the focal point of the reflector. Consequently, the number of data streams which can be transmitted/received simultaneously is limited to the number of data streams which fit into one frequency band.

Also, having to physically move the C-band, X-band and Ku-band antenna feed structures to and from the focal point of the reflector is a time-consuming and tedious operation. However, if the movement is not done accurately, misalignment problems between the reflector and the I/O port of the antenna feed structure will occur.

Specifically, when the I/O port of an antenna feed is misaligned with its reflector, the radiation pattern of the transmitted electromagnetic waves will be distorted. In turn, this distortion can interfere with transmissions from any other independent sources. Thus, after a switch is made from one antenna feed to another, tests must be rerun to obtain actual radiation patterns, and those radiation patterns must be recertified by some organization such as the FCC, INTELSAT, EUTELSAT, AND PANAMSAT. This process takes days to complete. Consequently, practically all ground stations limit their transmissions/receptions to just one of the three bands C, X, and Ku.

Accordingly, a primary object of the present invention is to provide a novel structure for a multi-band antenna feed by which all of the above drawbacks are overcome.

BRIEF SUMMARY OF THE PRESENT INVENTION

With the present invention, a single integrated antenna feed is provided which transmits and receives electromagnetic waves in the C, X, and Ku frequency bands. This antenna feed includes an inner metal tube which lies along a central axis, and an outer metal tube which surrounds and is coaxial with the inner metal tube. Through the inner tube, a passageway is provided which is sized to carry electromagnetic waves in the X-band and Ku-band, but reject electromagnetic waves in the C-band. Between the inner tube and the outer tube, another passageway is provided which is sized to carry electromagnetic waves in the C-band.

An I/O port for the X and Ku-bands is provided by a first end of the inner tube, and an I/O port for the C-band is provided by a corresponding first end of the outer tube. This first end of the outer tube lies proximate to but not past the first end of the inner tube. A solid dielectric is inserted into and fills the first end of the inner tube; and, a hollow metal cone is attached to the first end of the outer tube.

With the above antenna feed, data transmission and reception can occur in the C-band while data transmission and reception simultaneously occurs in the X or Ku-band. Consequently, the amount of data which can be routed to and from other earth stations in any given time interval is greatly increased in comparison to the amount of data which can be routed in just one band.

Also with the above antenna feed, data transmission/reception can be changed from one band to another without physically moving the feed. Thus, whenever a band change is made, no time consuming alignments of any kind are required; and, no tests need to be run to establish that the radiation patterns are proper.

Further with the above antenna feed, the radiation patterns for the C, X, and Ku-bands all emanate from a single phase center. Having a single phase center is important because it enables a reflector to be properly illuminated by all three bands without moving the antenna feed.

In addition, with the above antenna feed, transmissions and receptions occur in all three frequency bands with a very high efficiency (i.e.—with small power losses). This high efficiency, during transmission or reception, is due primarily to the absence of any large standing waves within the inner tube and the space between the inner and outer tubes.

Also with the above antenna feed, the radiation patterns for C-band are generated with minimal obstruction from the inner tube. This feature occurs due to the presence of the dielectric insert. If the insert is deleted, the diameter of the inner tube must be increased before the received X-band waves will enter the inner tube; but, such an increase changes the phase of the radiated C-band waves which destroys the common phase center for the three frequency bands.

BRIEF DESCRIPTION OF THE DRAWINGS

Various preferred embodiments Of the invention are described herein in conjunction with the accompanying drawings, wherein:

FIG. 3 shows a preferred physical structure for two consecutive portions 20 and 30 in the antenna feed of FIG. 1;

FIG. 4 is a cross-sectional view, taken along lines 4—4 in portion 20, of the antenna feed in FIG. 3;

FIG. 5 is a cross-sectional view, taken along lines 5—5 in portion 30, of the antenna feed in FIG. 3;

FIG. 6 is a cross-sectional view, taken along lines 6—6 in portion 30, of the antenna feed in FIG. 3;

FIG. 8 is a pictorial view of a portion 50 in the antenna feed, which connects to portion 30 in FIG. 3;

FIG. 9 is a cross-sectional view of a cylinder 51 which is a component within the feed portion 50;

FIG. 9A is a cross-sectional view of a modified version of the cylinder 51 in FIG. 9;

FIGS. 12a, 12b, 12c, 12d, 12e and 12f are computer generated plots which show the magnitude of the E field which radiates from the feed portion 20 for six different frequencies in the C, X, and Ku-bands; and, FIG. 13a, 13b, 13c, 13d, 13e and 13f are computer generated plots which show the phase of the E field which radiates from the feed portion 20 for the six different frequencies of FIGS. 12a–12f.

DETAILED DESCRIPTION

Figures 1, 2:
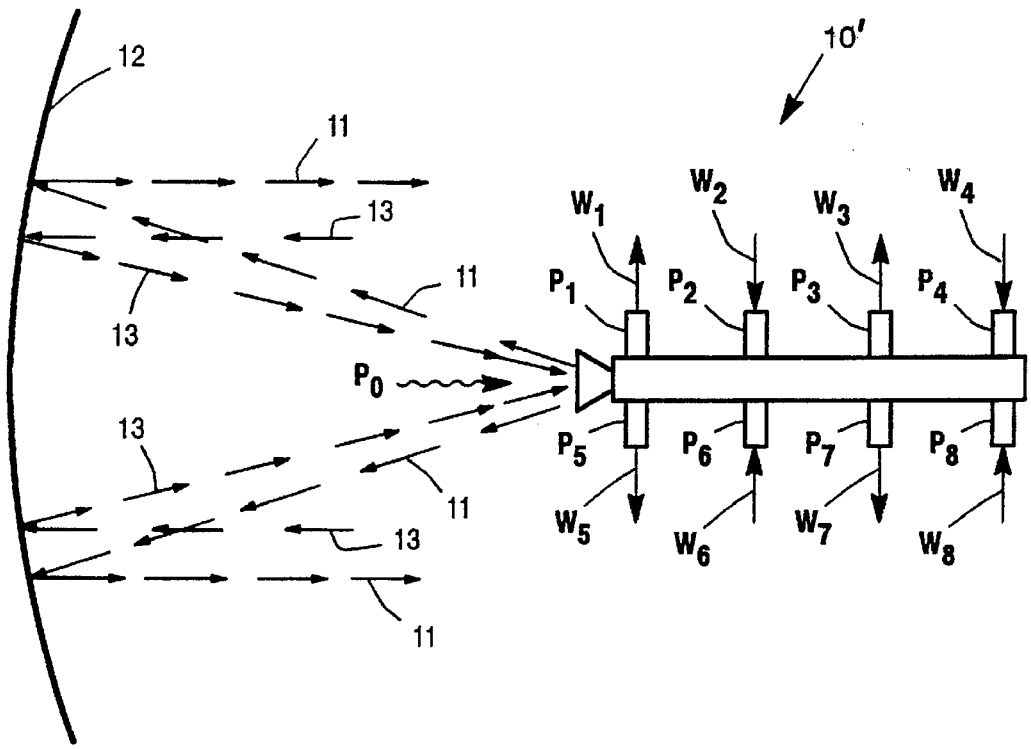
FIG. 1 is a schematic diagram of an antenna feed which, in accordance with the present invention, operates in three frequency bands.
FIG. 2 shows a table which indicates how electromagnetic waves in the C, X, and Ku-bands pass through several ports P0–P8 in the antenna feed of FIG. 1.

Referring now to FIG. 1, it shows an item 10' which is a schematic representation of a tri-band antenna feed that operates in accordance with the present invention. That schematic 10' is herein provided to give an overview of the functional capabilities which the actual antenna feed 10 has. A preferred physical structure for the actual antenna feed 10 is provided herein by FIGS. 3–9.

Note that a reflector 12, which is also shown in FIG. 1, is not part of the present invention. That reflector 12 simply shows the relationship of the antenna feed 10' to any desired type of conventional antenna system. These conventional antenna systems include a cassigraine system, a Gregorian system, a direct focus system, and a offset focus system.

Included in the schematic 10', as well as the actual antenna feed 10, are nine ports $P_0$, $P_1$, $P_2$, $P_3$, $P_4$, $P_5$, $P_6$, $P_7$, $P_8$. Through those ports, electromagnetic waves $W_0$, $W_1$, $W_2$, $W_3$, $W_4$, $W_5$, $W_6$, $W_7$, $W_8$ are passed in the C, X and Ku-bands as listed in FIG. 2.

All of the C, X, and Ku-band electromagnetic waves which travel into the transmit ports $P_2$, $P_4$, $P_6$, and $P_8$ pass through the antenna feed 10' and exit it from the single I/O port $P_0$ as a composite electromagnetic wave 11. At the transmit ports, the waves enter from a dominant mode waveguide; and as they travel to the I/O port $P_0$, they get polarized by the antenna feed as listed in FIG. 2. Then from port $P_0$, the composite wave 11 is directed by the reflector 12 to a geosynchronous satellite (not shown).

Likewise, a composite electromagnetic wave 13 which is broadcast by the satellite in the C, X, and/or Ku-bands is directed by the reflector 12 into the single I/O port $P_0$. Then, from port $P_0$, that composite wave 13 passes through the antenna feed 10 whereupon the C, X and Ku-bands are separated and routed to the receive ports $P_1$, $P_3$, $P_5$ and $P_7$ as listed in FIG. 2. After this separation occurs, the received waves get unpolarized by the antenna feed before they exit at the receive ports.

As a specific example of the above, consider row 1 of FIG. 2. It shows that port $P_1$ is a receive (RCV) port, which means that the electromagnetic waves $W_1$ travel out of port $P_1$. Also, as row 1 of FIG. 2 further indicates, the electromagnetic waves $W_1$ are horizontally polarized at the I/O port $P_0$ and they occupy the C-band frequency range of 3.625 GHz to 4.200 GHz.

Similarly, row 6 of FIG. 2 shows that port $P_6$ is a transmit (XMT) port, which means that the electromagnetic waves $W_6$ travel into port $P_6$. Also, as row 6 of FIG. 2 further indicates, the electromagnetic waves $W_6$ are left-hand circularly polarized when they exit the I/O port $P_0$, and they occupy the X-band frequency range of 7.900 GHz to 8.400 GHz.

Now, a preferred physical structure for the antenna feed 10 as shown in FIGS. 3–9 will be described. To begin, reference should be made to FIGS. 3–6 which illustrate the physical make-up of two consecutive portions 20 and 30 of the antenna feed 10 which begin at the I/O port $P_0$.

Portion 20 includes a pair of metal tubes 21 and 22 which have a circular cross-section as shown in FIGS. 3. Tube 21 lies inside of tube 22, and both of the tubes 21 and 22 are centered on the axis 23. Tube 21 has an inside diameter of about 0.5 inches to 1.2 inches; tube 21 has a wall thickness of about 0.015 inches to 0.25 inches; and the spacing between the two tubes 21 and 22 is about 0.5 inches to 1.0 inches.

Also included in portion 20 of the waveguide is a solid dielectric insert 24 which is attached to and fills an end 21a of the inner tube 21. Preferably, the plug 24 is cylindrically shaped with tapered ends such that it fits snugly into the inner tube 21. Also, preferably, the insert 24 has a relative dielectric permittivity of 1.5 to 6.5. This may be achieved, for example, by making the plug 23 out of nylon, Teflon (a synthetic florine containing resin), and similar materials.

Lastly included in portion 20 of the waveguide is a hollow metal cone 25 which is attached to one end 22a of the outer tube 22. This cone is concentric with the axis 23, and it extends away therefrom at an angle of about twenty to fifty degrees. The inner surface of the cone 25 can be smooth, or it can have a set of circular groves 25a as shown in FIG. 3. Preferably, the open end of the cone 25 is between three and six inches in diameter.

In operation, the X-band and Ku-band electromagnetic waves which are sent into the ports P6 and P8 for transmission, get routed within the antenna feed 10 (in a manner which will be described in conjunction with FIG. 8) to the inner tube 21. Then, these X-band and Ku-band electromagnetic waves travel in the tube 21 toward end 21a where they pass through the dielectric insert 24; and that insert shapes their radiation pattern.

Similarly, the X-band and Ku-band electromagnetic waves which are received on the ports $P_5$ and $P_7$, reach those ports by passing through the dielectric insert 24 into end 21a of the inner tube 21. Those X-band and Ku-band waves are then routed through the inner tube 21 of the antenna feed 10 to the ports $P_5$ and $P_7$.

By comparison, the C-band electromagnetic waves which are sent into the ports $P_2$ and $P_4$ for transmission, get routed within the antenna feed 10 (in a manner which will be described in conjunction with FIG. 7) to the space between the two tubes 21 and 22. Then, the C-band electromagnetic waves travel in that inter-tube space to end 22a of tube 22, whereupon the cone 25 and insert 24 shape their radiation pattern.

Similarly, the C-band electromagnetic waves which are received on the ports $P_1$ and $P_3$, reach those ports by passing through the tube end 22a into the space between the tubes 21 and 22. Those C-band waves then travel through the inter-tube space and get routed to the ports $P_1$ and $P_3$.

Electromagnetic waves in all three of the bands C, X, and Ku are focused by the reflector 12 to end 21a of the inner tube 21. However, the only electromagnetic waves which enter the inner tube 21 are those which lie in the X-band and the Ku-band. Electromagnetic waves which lie in the C-band are excluded from entering into the inner tube 21 because the C-band wavelengths are too large in comparison to the inside diameter of the inner tube 21. Consequently, the C-band waves spill over into the spacing between the tubes 21 and 22.

One primary feature which is achieved by the above described portion 20 of the antenna feed 10 is that data transmissions/receptions can occur in the C and Ku, or C and X bands simultaneously. Consequently, the ability to route the data to and from other earth stations at any given time is greatly increased in comparison to the routing of data which can occur in just one band.

Another primary feature of the antenna feed portion 20 is that data transmission/reception can be changed from one band to another without physically moving the feed. Thus, whenever a band change is made, no time consuming alignments of any kind are required. Further, whenever a band change is made, no tests need to be run to establish and certify that the radiation patterns are proper.

Still another major feature which is achieved by the above described antenna feed portion 20 is that the radiation patterns for the C, X, and Ku-bands all emanate from a single phase center. This phase center is located within one inch of the end 21a of the inner tube 21. Having a single phase center location is important because it enables the reflector 12 to be properly illuminated by all three bands without moving the antenna feed. Proper illumination requires that the phase of the waves on all points of the reflector be within approximately 45° for all bands. This prevents phase cancellations in the radiation pattern from the reflector. Additional details on this feature are described herein in conjunction with FIGS. 12a–12f and 13a–13f.

Yet another major feature which is achieved by portion 20 of the antenna feed 10 is that the transmissions and receptions occur in all three frequency bands with a very high efficiency (i.e.—with small power losses). This high efficiency during any transmission or reception is due primarily to the absence of any large standing waves within either the inner tube 21 or the space between the tubes 21 and 22. Additional details on this feature are described herein in conjunction with FIGS. 10–11.

Still another primary feature which is achieved by the portion 20 of the antenna feed 10 is that the radiation patterns for C-band are generated with essentially no obstruction from the inner tube 21. This feature occurs due to the presence of the dielectric insert 24. If the insert 24 is deleted, the diameter of the inner tube 21 must be increased before the received X-band waves will enter the inner tube. But, when the diameter of tube 21 is increased, the phase at which the C-band waves enter/exit the space between the tubes 21 and 22 gets changed such the common phase center for all three bands is destroyed.

Next, with reference to FIGS. 3, 5, and 6, the structure and operation of portion 30 (see FIG. 3) of the antenna feed 10 will be described. This portion 30 is made of metal; and it has a cone-shaped exterior which is centered on the axis 23. The wide end, and the narrow end, of the antenna feed portion 30 are identified in FIG. 3 by reference numerals 36b and 36a, respectively. Reference numerals 46a, 46b, and 57c in FIG. 3 identify items from FIGS. 7 and 8 that connect to the wide end 36b of the feed portion 30. Inside of this antenna feed portion 30 are five waveguides 31, 32, 33, 34, and 35 as shown in FIGS. 5 and 6. Waveguide 31 runs through the center of the antenna feed portion 30 along the axis 23, and it has a circular cross-section which matches the inside diameter of the tube 21.

All four of the remaining waveguides 32–35 run parallel to the cone-shaped exterior of the antenna feed portion 30, and they are symmetrically spaced about the axis 23. On the narrow end 36a (see FIG. 3) of the antenna feed portion 30, the four waveguides 32–35 have a truncated-pie shape as shown in FIG. 5, and they are aligned with the space between the two tube ends 21b and 22b (see FIG. 3) of the antenna feed portion 20. Those tube ends 21b and 22b (see FIG. 3) are rigidly attached, such as by welding or brazing, to the narrow end 36a of the antenna feed portion 30.

In each of the four waveguides 32–35, starting from the narrow end 36a and proceeding to the wide end 36b of the antenna feed portion 30, the cross-section gradually changes from a truncated-pie shape to a rectangular shape. This is seen from FIGS. 5 and 6. Also as FIGS. 5 and 6 show, each of those four waveguides 32–35 contain a small ridge which runs throughout their length; and, that ridge helps to confine the electromagnetic waves which are carried by those waveguides to their primary modes. These ridges taper away as they enter end 21b of the tube 21. This taper preferably is gradual and occurs over a distance of at least two inches in order to avoid standing waves in the waveguides 32–35.

In operation, all of the X-band and Ku-band electromagnetic waves, (which go to and from the ports $P_5$–$P_8$ as listed in FIG. 2), are carried in their polarized form by the one central waveguide 31. By comparison, just the horizontally polarized C-band electromagnetic waves, (which go to the receive port $P_1$ and come from the transmit port $P_2$ as listed in FIG. 2), are carried by the two waveguides 33 and 35. Waveguide 33 carries half of those horizontally polarized waves and waveguide 35 carries the other half. Similarly, just the vertically polarized C-band electromagnetic waves, (which go to the receive port $P_3$ and come from the transmit port $P_4$ as listed in FIG. 2), are carried by the two waveguides 32 and 34. Waveguide 32 carries half of those vertically polarized waves and waveguide 34 carries the other half.

Figure 7:
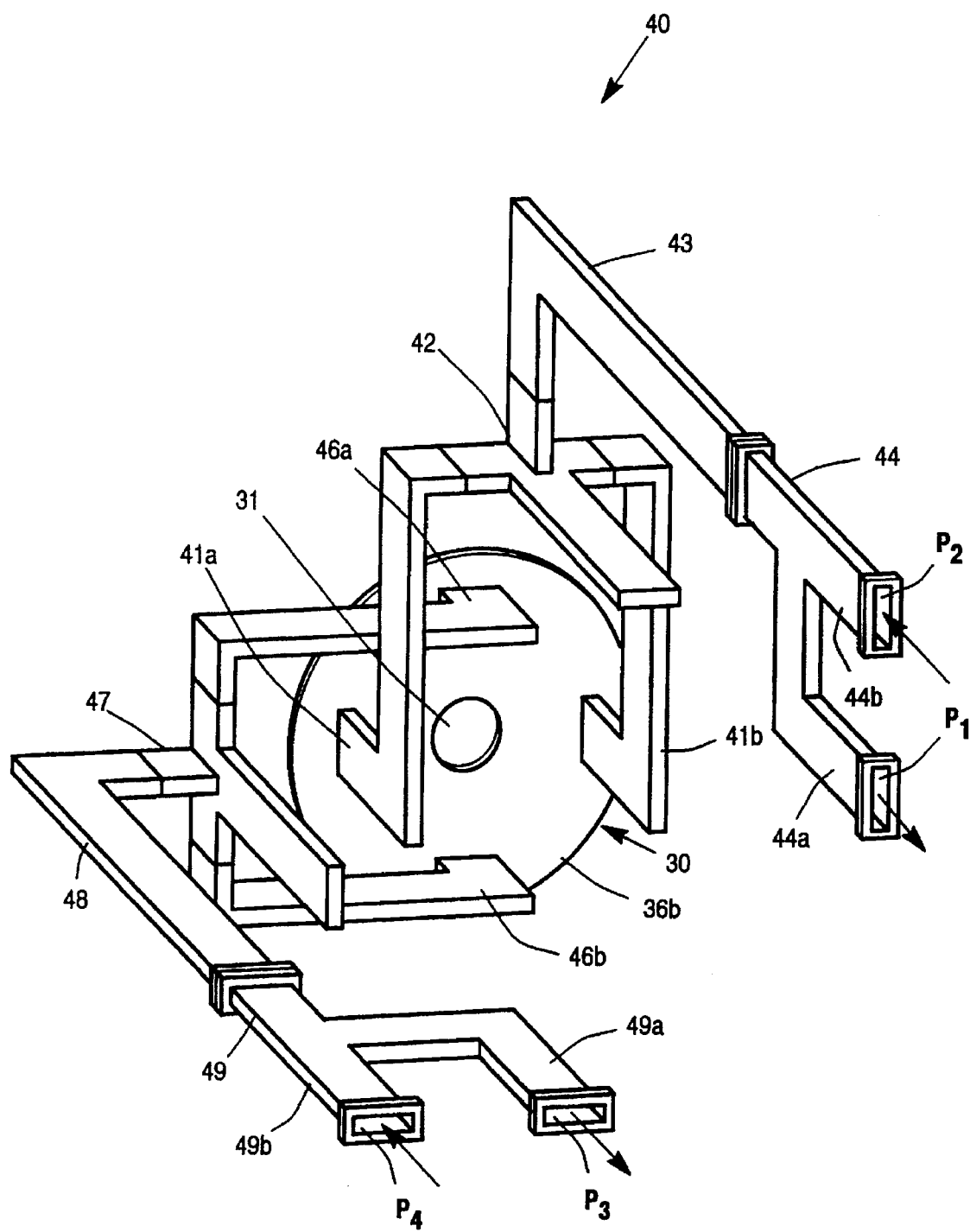
FIG. 7 is a pictorial view of a portion 40 in the antenna feed, which connects to portion 30 in FIG. 3.

Next, with reference to FIG. 7, the structure and operation of another portion 40 of the antenna feed 10 will be described. This antenna feed portion 40 connects to end 36b of the antenna feed portion 30; and by it, the four C-band ports P1, P2, P3, and P4 are provided.

In order to form two of the ports P1 and P2, the antenna feed portion 40 includes a pair of metal waveguides 41a and 41b, a hybrid-T junction 42 with a load, another metal waveguide 43, and a co-polar receive and transmit diplexer 44. Within waveguide 41a is a ridged rectangular passageway which matches and is aligned with the passageway 33 on end 36b of the antenna feed portion 30. Likewise, within waveguide 41b is a ridged rectangular passageway which matches and is aligned with the passageway 35 on end 36b of the antenna feed portion 30. Both of the passageways in the waveguides 41a and 41b are routed to a ridged rectangular passageway within the waveguide 43 through the hybrid-T junction 42. In turn, waveguide 43 connects to the co-polar diplexer 44 whose two open ends 44a and 44b, respectively, are the ports P1 and P2.

Similarly, to form the other two ports P3 and P4, the antenna feed portion 40 includes a pair of metal waveguides 46a and 46b, a hybrid-T junction 47 with a load, another metal waveguide 48, and a co-polar receive and transmit diplexer 49. Within waveguide 46a is a ridged rectangular passageway which matches and is aligned with the passageway 32 on end 36b of the antenna feed portion 30. Likewise, within tube 46b is a ridged rectangular passageway which matches and is aligned with the passageway 34 on end 36b of the antenna feed portion 30. Both passageways in the waveguides 46a and 46b are routed to a ridged rectangular passageway within the waveguide 48 through the hybrid-T connector 47. Then, waveguide 48 connects to the diplexer 49 whose two open ends 49a and 49b respectively are the two ports P3 and P4.

In operation, horizontally polarized C-band electromagnetic waves (both transmitted and received), travel through components 41a, 41b, 42, 43 and 44. Vertically polarized C-band electromagnetic waves (both transmitted and received) travel through components 46a, 46b, 47, 48 and 49.

Transmitted energy from the port P2 is divided by the hybrid-T junction 42 such that half of the energy is passed to waveguide 41a and half of the energy is passed to waveguide 41b. Received energy in the waveguides 41a and 41b is combined by the junction 42 and sent to the waveguide 43. Then the received energy in the waveguide 43 is separated from transmitted energy by the diplexer 44 such that the received energy emerges at port P1.

Transmitted energy from the port P4 is divided by the hybrid-T junction 47 such that half of the energy is passed to waveguide 46a and half of the energy is passed to waveguide 46b. Received energy in the waveguides 46a and 46b is combined by the junction 47 and sent to the waveguide 48. Then the received energy in the waveguide 48 is separated from transmitted energy by the diplexer 49 such that the received energy emerges at port P3.

Next, with reference to FIGS. 8 and 9, the structure and operation of a remaining portion 50 of the antenna feed 10 will be described. This portion 50 operates as a dual frequency waveguide switch that routes the X-band electromagnetic waves to/from the ports P5 and P6, and routes the Ku-band electromagnetic waves to/from the ports P7 and P8.

Included within the switch 50 is a cylinder 51 which is held by and rotates within a housing 55. Inside of the cylinder 51 are two passageways 52 and 53 (see FIG. 9). Passageway 52 goes straight through the cylinder 51 from one end to the other, and it lies on an axis 52a which is parallel to but offset from the central axis 51a of the cylinder 51. Along the axis 52a, in a plane perpendicular to that axis, the passageway 52 has a uniform circular shape which matches the waveguide 31 in the antenna feed portion 30.

By comparison, the passageway 53 goes only partway through the cylinder 51 along an axis 53a which is parallel to but offset from the central axis 51a of the cylinder 51. Then, the passageway 53 makes a 90° turn and goes to the side of the cylinder 51. On the end of cylinder 51, the passageway 53 has a circular shape which matches waveguide 31 in the antenna feed portion 30; whereas on the side of cylinder 51, the passageway 53 has a square shape. A transition 53b, from a circular shape to a square shape, occurs gradually within the passageway 53 as shown in FIG. 9, and it is completed before the 90° turn begins.

Included in the housing 55 is a sleeve 56 and two end covers 57 and 58. Cylinder 51 rotates inside of the sleeve 56. To enable this rotation to occur, the cylinder 51 has a shaft 54 on the center axis 51a which passes through two holes 57a and 58a in the end covers 57 and 58.

Mounted on the end cover 58 is an electric latching solenoid 59 which rotates the shaft 54 to two positions A and B which are 180° apart. Movement to position A and position B selectively occurs in response to electrical control signals on a pair of leads 59a. In position A, the straight passageway 52 in cylinder 51 is aligned with an opening 57b in the end cover 57 and an opening 58b in the end cover 58. In position B, the curved passageway 53 in the cylinder 51 is aligned with the opening 57b in the end cover 57 and an opening 56a in the side of the sleeve 56.

Opening 57b continues through a projection 57c on the end cover 57, and that projection is attached to the end 36b of the antenna feed portion 30. In its attached position, the opening 57b is centered on the waveguide axis 23 and aligned with the central passageway 31.

In operation, the cylinder 51 is put in position A to enable the straight passageway 52 to carry X-band electromagnetic waves between the openings 57b and 58b. If any unwanted Ku-band electromagnetic waves enter the central passageway 31 from the reflector 12 when the cylinder 51 is in position A, those Ku-band waves are separated from the X-band waves by a filter (not shown) at any point after the opening 58b.

By comparison, the cylinder 51 is put in position B to enable the curved passageway 53 to carry Ku-band electromagnetic waves between the openings 57b and 56a. If any unwanted X-band electromagnetic waves enter the central passageway 31 from the reflector 12 when the cylinder 51 is in position B, those X-band waves are rejected by the square portion of the cross-section in the passageway 53.

Thus, one primary feature of the waveguide switch 50 is that no separate filter is needed after the passageway 53 since the square portion of the passageway acts as a filter which rejects X-band waves. Also, by making the square cross-sectional portion of the passageway 53 just large enough to barely pass primary mode Ku-band waves, undesired high order modes in the Ku-band waves are rejected. Both Of these features are achieved, for example, by making the square portion of the passageway 53 with an opening of 0.50" to 0.60" on a side.

Still another primary feature of the waveguide switch 50 is that it preserves the polarization of the electromagnetic waves which pass through the switch in both the X-band and the Ku-band. Thus, the received X-band waves stay right-hand circularly polarized as they go through the passageway 52; the transmitted X-band waves stay left-hand circularly polarized as they go through the passageway 52; the received Ku-band waves stay horizontally polarized as they go through the passageway 53; and the transmitted Ku-band waves stay vertically polarized as they go through the passageway 53.

To obtain the two ports P5 and P6, a septum polarizer 58c is attached to the end cover 58 in alignment with the opening 58b. This septum polarizer 58c converts right-hand circularly polarized waves, which are received in the X-band and are routed to the passageway 52, to dominant rectangular $TE_{10}$ waves in port P5. Also the septum polarizer 58c converts rectangular $TE_{10}$ waves, which are sent in the X-band to port P6 for transmission, to left-hand circularly polarized waves in the passageway 52.

Similarly, to obtain the two ports P7 and P8, an Orthomode (orthogonal mode) transducer 56b is attached to the sleeve 56 in alignment with the opening 56a. This orthomode transducer 56b converts horizontally polarized waves, which are received in the Ku-band and are routed to passageway 53, to rectangular $TE_{10}$ waves on port P7. Also, the transducer 56b converts rectangular $TE_{10}$ waves, which are sent in the Ku-band to port P8 for transmission, to vertically polarized waves in passageway 53.

Figure 10:
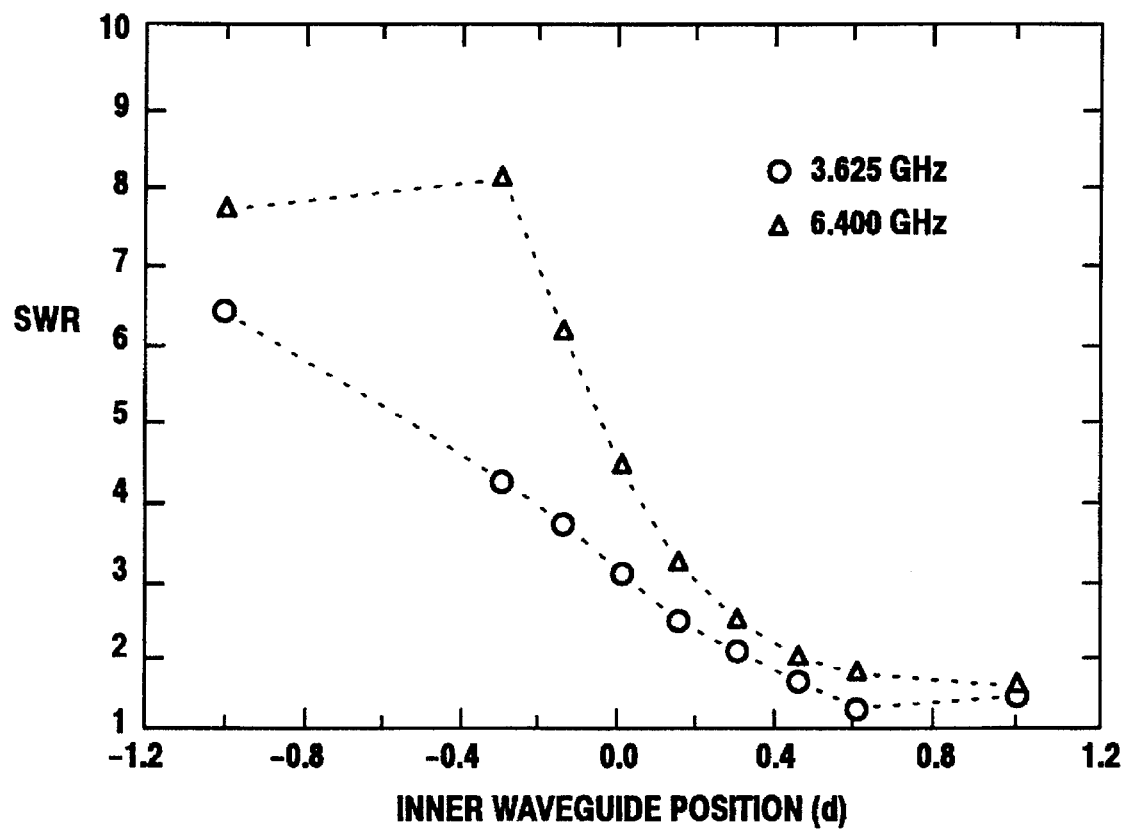
FIG. 10 is a set of curves which illustrate how standing waves are reduced in the feed portion 20, by properly selecting a position parameter "d" for the feed portion 20.
Figure 11A:
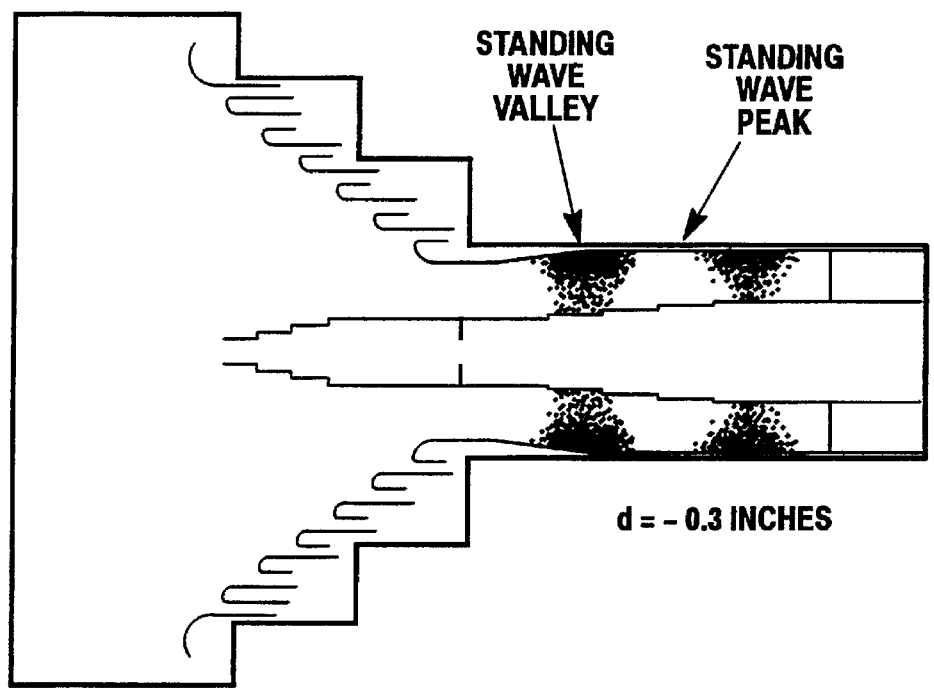
FIG. 11a is a computer generated graphic which shows that large standing waves occur in the feed portion 20 when the parameter "d" is not properly selected.
Figure 11B:
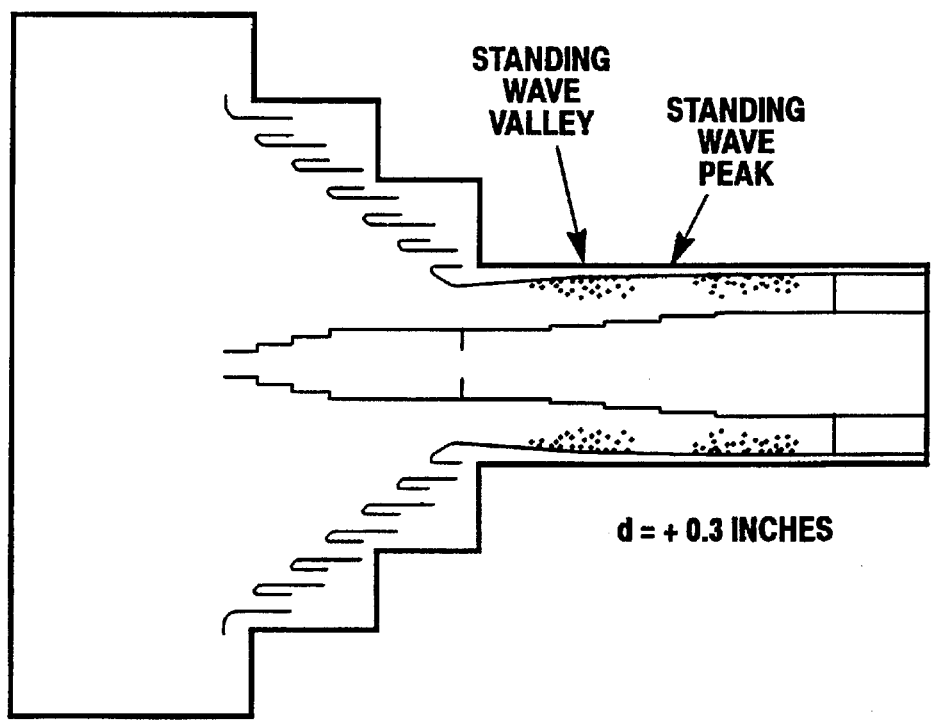
FIG. 11b is a computer generated graphic which shows that standing waves are greatly reduced in the feed portion 20 when the parameter "d" is properly selected.

Referring now to FIGS. 10, 11a, and 11b, experimental evidence which verifies a major feature of the antenna feed 10 will be described. This particular feature is that the reception/transmission of electromagnetic waves into/from the I/O port of the antenna feed 10 occurs with a very small reflection loss. This small loss was particularly difficult to achieve for C-band.

In FIG. 10, a graph is shown which plots a distance "d" on the horizontal axis and a standing wave ratio "SWR" on the vertical axis. This distance "d" is the amount by which the inner tube end 21a extends beyond the outer tube end 22a in the antenna feed portion 20 as shown in FIG. 1.

For each particular distance "d", a different size standing wave occurs in the antenna feed portion 20 throughout the space between the two tubes 21 and 22. In FIG. 10, the size of this standing wave is given by the SWR, which is the ratio of the maximum E field in the standing wave to the minimum E field in the standing wave.

As the SWR increases in size, a corresponding power loss due to reflections within the antenna feed 10 also increases. Consequently, to minimize the reflection loss, the distance "d" in the waveguide portion 20 should be confined to a range which produces the minimum SWR. Inspection of FIG. 10 shows that the range for the distance d which yields the minimum SWR is from d=0 inches to d=2 inches.

In order to determine the SWR that occurs at each particular distance "d" in FIG. 10, a computer program was written which simulates the antenna feed 10. One output from this computer simulation is a graphic presentation portraying the standing waves that occurs in the space between the two coaxial tubes 21 and 22 at C-band. FIG. 11a is one such graphic for a distance "d" of −0.3 inches, and FIG. 11b is another such graphic for a distance "d" of +0.3 inches. Comparing FIG. 11a to FIG. 11b shows that the SWR which occurs when "d" is −0.3 inches is at least twice as large as the SWR which occurs when "d" is +0.3 inches. In both of the FIGS. 11a and 11b, the frequency is 3.625 GHz, and similar results occur with other C-band frequencies.

Next, referring to FIGS. 12a, 12b, 12c, 12d, 12e and 12f and 13a, 13b, 13c, 13d, 13e and 13f experimental evidence which verifies another major feature of the waveguide 10 will be described. This particular feature is that the radiation patterns for the C, X, and Ku-bands all emanate from a single phase center.

FIGS. 12a, 12b, 12c, 12d, 12e and 12f are plots of the primary E-plane amplitude patterns which occur at port $P_0$ of the waveguide 10 at certain frequencies; and FIGS. 13a, 13b, 13c, 13d, 13e, and 13f are plots of the phase changes that occur across those patterns. In the plots, the frequencies are labeled; and they are representative of the C, X, and Ku-bands. Each plot was generated with the same computer program which generated the standing wave plots of FIGS. 11a and 11b; and this computer program is very sophisticated and produces highly accurate results. In particular, the program uses as a basis a finite difference time domain (FDTD) three-dimensional mesh which applies Maxwell's electromagnetic equations.

Suppose now that only the portions of the amplitude and phase plots which lie within ±30° to ±45° of the central axis "A" are used to illuminate a reflector. In that case, the C, X, and Ku-band waves will all focus at a common phase center because, as FIGS. 13a–13d show, the phase changes between any two points on the reflector will be much smaller than 45°; and that is small enough to prevent cancellations in the beam formed by the reflector.

A preferred embodiment of the present invention has now been described in detail. In addition, however, various changes can be made to this embodiment.

As one modification, many different types of reflectors can be used to direct the electromagnetic waves which are received from space to the I/O port $P_0$ and/or direct electromagnetic waves which are transmitted to space from the I/O port $P_0$. For example, the reflector 12 of FIG. 1 can be a primary reflector which sends/receives electromagnetic waves directly to/from space. Alternatively, the reflector 12 of FIG. 1 can be a sub-reflector which sends/receives electromagnetic waves to a primary reflector which in turn sends/receives the electromagnetic waves to/from space. In either case, the I/O port $P_0$ of the antenna feed 10 can be positioned as a central feed on the axis of the reflector with which it directly interfaces, or it can be positioned as an offset feed away from that axis.

As another modification, the passageway through the inner tube 21 and the passageway between the inner tube 21 and the outer tube 22, can have a variety of cross-sectional shapes. For example, the cross-sectioned shape of those passageways can be circular as shown in the Figures; or it can be multisided (such as an octagon) and approximate a circle. Likewise, the cross-section can be slightly elliptical and approximate a circle. In each case, the passageway through the inner tube 21 is sized to carry electromagnetic waves in high frequency band and reject electromagnetic waves in a low frequency band; whereas the passageway between the tubes 21 and 22 is sized to carry the electromagnetic waves in the low frequency band.

As yet another modification, the antenna feed 10 need not operate in all three of the frequency bands C, X, and Ku. For example, the antenna feed 10 may be modified to operate in just the C and X bands. In that case the ports P7 and P8 as well as their coupling to the inner tube 21, will be eliminated. Likewise, the antenna feed 10 may be modified to operate in just the C and Ku-bands. In that case the ports P5 and P6, as well as their coupling to the inner tube 21, will be eliminated.

Similarly, the antenna feed 10 may be modified to transmit but not receive in certain bands, and it can be modified to receive but not transmit in certain bands. For example, a receive-only version of the antenna feed 10 may be obtained by eliminating ports P2, P4, P6 and P8, as well as their coupling to the two tubes 21 and 22.

Further, various modifications can be made to the preferred embodiment of the switch 50 which is shown in FIGS. 8 and 9. For example, the two passageways 52 and 53 can be located 90° apart on the cylinder 51 rather than 180° apart as shown.

Also, the passageway 53 need not make a 90° turn to the side of the cylinder 51 as shown in FIG. 9. Instead, the passageway 53 can make a gradual turn toward the side Of the cylinder 51, and then turn back and go parallel to the axis 51a until it goes through the end cover 58. This is shown in FIG. 9A wherein reference numeral 53' identifies the modified passageway 53 and reference numberal 51' identifies a modified cylinder 51.

Further, the number of passageways which are in the cylinder 51 is not limited to two. For example, the cylinder 51 can have three passageways which are spaced 120° apart. One of the three passageways can be straight like passageway 52; one can be bent 90° like passageway 53; and one can have the shape described above.

In addition, the cross-section of the passageway 52 can be modified to be a uniform square which passes X-band waves, while the cross-section of passageway 53 is modified to begin at end cover 57 with the same size square as passageway 52 and thereafter make a gradual transition to a small square which passes just Ku-band waves. With this modification a circular-to-square transition should be included in the projection 57c of the end cover 57 so that the passageway through that projection still matches the passageway 31 is the feed portion 30 of FIG. 3.

Also, as still another modification, an arm can be attached to the shaft 54 of the cylinder 51 in order to enable that cylinder to be moved manually to the two positions A and B. With this modification, the electric latching solenoid 59 will be eliminated.

Accordingly, it is to be understood that the present invention is not limited to just the illustrated preferred embodiment, but is defined by the appended claims.

What is claimed is:

1. A tri-band antenna feed for transmitting/receiving electromagnetic waves in the C, Ku and X frequency bands, comprising:

an inner metal tube which lies along a central axis, and an outer metal tube which surrounds and is coaxial with said inner metal tube;

said inner tube having an inner passageway which passes electromagnetic waves in said Ku and X bands but rejects electromagnetic waves in said C band;

said outer tube together with said inner tube defining an outer passageway therebetween which passes electromagnetic waves in said C band;

said inner tube having a first end, and said outer tube having a corresponding first end which lies proximate to but not past said first end of said inner tube such that said C, Ku and X bands all have a common phase center located with respect to said antenna feed;

a solid dielectric which is attached to and covers said first end of said inner tube to thereby provide an I/O port for said Ku and X band;

a hollow metal cone which is attached to said first end of said outer tube to thereby provide an I/O port for said low frequency waves; and, a switch which is coupled to a second end of said inner tube and which has: a) a first moveable passageway that selectively aligns with said inner passageway and passes both said Ku and X bands; and b) a second moveable passageway that selectively aligns with said inner passageway and passes said Ku band but rejects said X band.

2. An antenna feed according to claim 1 which further includes four metal waveguides which couple to a second end of said outer tube, with two of said waveguides being spaced 180° apart on said outer tube and thereafter merged together, and the remaining two of said waveguides also being spaced 180° apart on said outer tube and thereafter merged together.

3. An antenna feed according to claim 1 which further includes four metal waveguides which—a) couple to a second end of said outer tube and b) have openings that are located in said passageway between said outer and inner tubes, and symmetrically spaced about said central axis.

4. An antenna feed according to claim 1 which further includes four metal waveguides which couple to a second end of said outer tube and extend away therefrom with a cross-section that gradually changes from a truncated pie shape to a rectangular shape.

5. An antenna feed according to claim 1 wherein said central axis is straight.

6. An antenna feed according to claim 1 wherein said central axis and said first moveable passageway are straight, and said second moveable passageway is curved.

7. An antenna feed according to claim 1 wherein said inner tube and said outer tube each have a circular cross-section perpendicular to said axis.

8. An antenna feed according to claim 1 wherein said inner tube and said outer tube each have a cross-section perpendicular to said axis which approximates a circle.

9. An antenna feed according to claim 1 wherein said first end of said inner tube extends past said first end of said outer tube by less then two inches.

10. An antenna feed according to claim 1 wherein said solid dielectric is no larger than said inner tube in a plane perpendicular to said axis.

11. An antenna feed according to claim 1 wherein said solid dielectric fills said first end of said inner tube.

12. An antenna feed according to claim 1 wherein said solid dielectric has a relative permittivity of 1.5 to 6.5.

* * * * *